May 26, 1970  R. MODÉMÉ  3,513,508
FASTENER FOR TUBES OR LIKE OBJECTS
Filed June 12, 1968  2 Sheets-Sheet 1
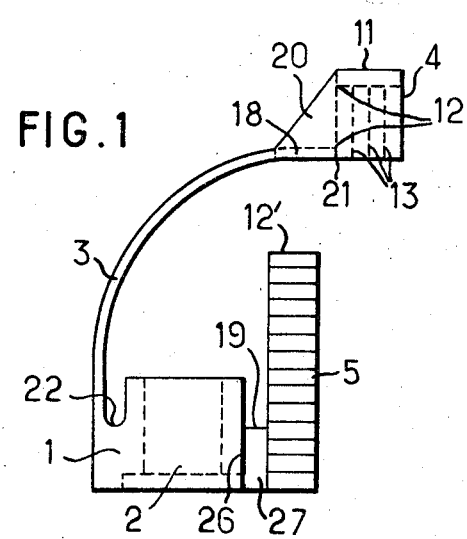
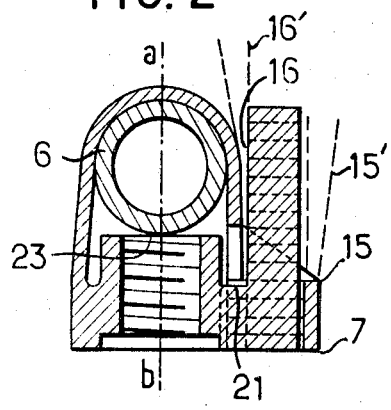
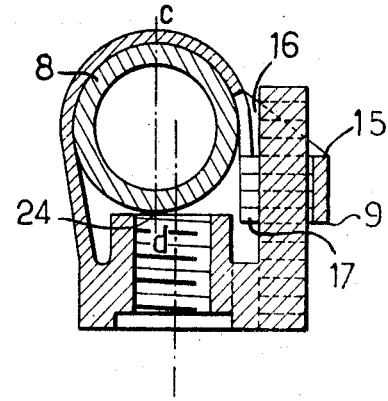
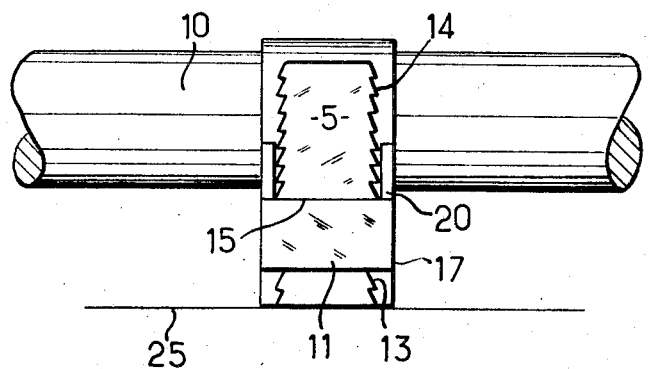
INVENTOR
ROBERT MODÉMÉ
By Young + Thompson
ATTYS.

May 26, 1970  R. MODÉMÉ  3,513,508
FASTENER FOR TUBES OR LIKE OBJECTS
Filed June 12, 1968  2 Sheets-Sheet 2
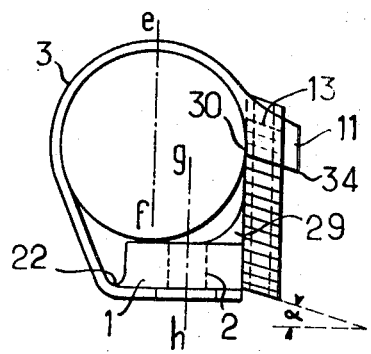
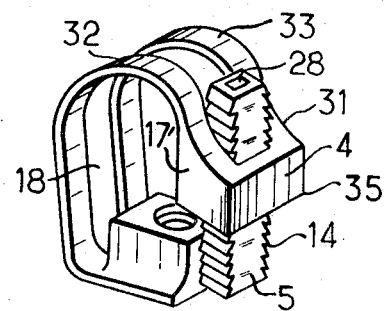
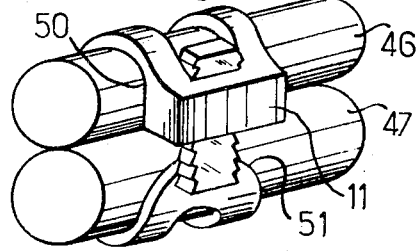
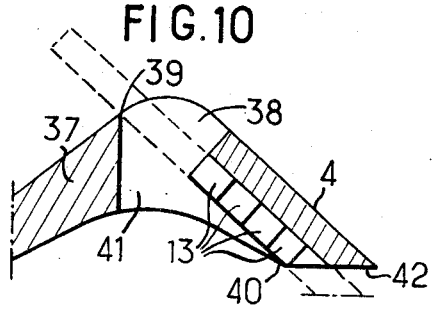
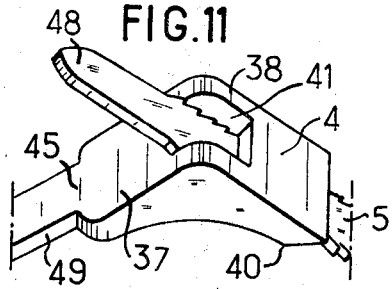
INVENTOR
ROBERT MODÉMÉ
By Young + Thompson
ATTYS.

United States Patent Office 3,513,508
Patented May 26, 1970

3,513,508
FASTENER FOR TUBES OR LIKE OBJECTS
Robert Modémé, Paris, France, assignor to Compagnie d'Etudes de Recherches Electroniques du Connexes CEREC, Deuil-la-Barre, France, a corporation of France
Filed June 12, 1968, Ser. No. 736,372
Claims priority, application France, June 12, 1967, 109,919; Mar. 27, 1968, 145,536
Int. Cl. B65d 63/00
U.S. Cl. 24—16                    4 Claims

ABSTRACT OF THE DISCLOSURE

A fastener for attaching tubes and like objects formed preferably of resilient plastics material and comprising a strap having at one end a protrusion or tongue and at the other end a receiving means such as a slot for the tongue, the tongue and receiving means each having opposed faces formed with co-operating saw-teeth or barbs which are arranged to interengage and lock when the strap is laid around a said object and the protrusion pressed into the receiving means.

---

The present invention relates to a fastener or attachment device for tubes and similar objects which is characterized by a strap provided on one of its ends with receiving means such as a tip or ferrule carrying a mortise such as a slot of which two opposed faces are formed with rows of saw-teeth or barbs and also by a protrusion such as an anchoring ramp or tongue engageable in the said mortise and provided with saw-teeth directed in a sense opposite to those of the mortise with which they can cooperate in order to maintain the fastener closed.

The fastener which may be made from a single piece of synthetic plastic material, may take the form of a collar enabling the fixing of the tube or other objects to a support such as a wall. In this case it comprises a flange pierced for example with an aperture allowing the passage of a screw or fastening stud.

The strap and the anchorage ramp may both form part of the flange, the latter advantageously being provided with releasing means giving greater flexibility to the strap and a greater latitude of anchorage on the ramp.

The flange may in all cases be disposed in a position somewhere on the device for example on the central part of the strap. It may also be omitted.

The fixing of the tube or other object in the fastener is accompanied by an elastic deformation of the strap which is a function of the dimensions of the tubes or objects to be fixed. For this purpose, the length of the strap being fixed, the difference in the development of the necessary length depending upon the size of the object to be fixed is compensated by graduation of the height of the anchorage on the toothed ramp. In consequence, the length of the ramp is equal to the difference in development of the strap taking place between the maximum size and the minimum size of the tube or object which it is possible to fix.

The present invention provides the possibility of creating a range of fasteners of which the fixing capacities for tubes of intermediate dimensions for each model, starting from the smallest, are progressive and proportional from one fastener to the other. This has the immediate advantage of limiting the number of moulds necessary for the range of useful dimensions while conserving in the fastener the harmony of its form and its practicality of use.

The quality of the plastic material employed for moulding for making the fastener is an important criterion of the profit. The weight is an element which it is necessary to reduce to a minimum. The form of the fastener presents the advantage of avoiding unuseful space volumes without nullifying the desired technical characteristics; further, it will equally be proposed to use a cheap plastic material depending upon the use to which the fastener is to be put: the fixing of cables for example does not require the same specifications proposed for tubes for sanitary intallations.

The following description with reference to the accompanying drawings provides a non-limitative example, illustrating how the invention may be put into effect, the details of the drawing and the description forming preferred features of the invention.

FIG. 1 is an end view of the collar before insertion of the tube,

FIG. 2 represents in section the minimum position of the collar after insertion of a tube, FIG. 3 represents in section the position of the collar after the insertion of a tube of larger diameter than that of FIG. 2, FIG. 4 represents a side view of the collar after insertion of a tube of intermediate diameter, FIG. 5 is a lateral view of a variation of collar applied to a tube of maximum diameter, FIG. 6 represents in perspective a view of the same collar in a fixing position of intermediate height, FIG. 7 is a perspective view of a modified fastener in the form of a strap or double collar, FIG. 8 is a perspective view of the assembly of two tubes by a double collar or strap, FIG. 9 is a partial end view of the mounting of a collar or strap following a third modification, FIG. 10 is a partial sectional view of the mortise of the third modification, FIG. 11 is a perspective view after mounting of the anchorage system of the third modification, and FIG. 12 is a perspective view of a collar-strap forming the third modification.

In the embodiment of FIGS. 1 to 4 a collar is constituted by a base 1 provided with an aperture 2 threaded or not and adapted to receive, inter alia, either a tapered stud or an ordinary screw for support to its support 25 (FIG. 4). On one side of the base runs a supple strap 3 terminated by a tip or ferrule 4 in which is formed a mortise or bottom 11 of which the side walls comprise saw-teeth 13. This mortise permits engagement of the base on an anchoring ramp or tenon 5 forming part of the base 1 and of which the side walls are provided with saw-teeth 13 orientated in a sense inverse to the teeth 13 (FIG. 4). The base comprises two slots 19 and 22, the slot 19 having the purpose of presenting an abutment in the extreme position of the collar indicated at 7 in FIG. 2 and the slot 22 having the purpose of permitting the pivoting of the strap 3 when it embraces tubes 6, 8 and 10 of different diameter, the planes a, b (FIG. 2) and c, d (FIG. 3) passing through the axis of the tubes, passing through the points 23 and 24 of the base as a function of the size of the tubes and the anchorage ramp or tenon 5 remaining fixed.

The base 1, the strap 3 and the mortise 4 are of the same width. The anchorage ramp or tenon 5 is, as far as the plane 26 of the base provided with grooves 27 for the purpose of allowing the sliding of the base 4 of the tenon 5 according to the extent of the saw-teeth 13.

Different positions which the collar may take up are represented in FIGS. 2, 3 and 4. The diameter of the tube 6 corresponds to the minimum position of the collar and is indicated in FIGS. 2 and 7. The diameter of the tube 8 gives the position of the collar indicated at 9 in FIG. 3. The diameter of the tube 10 gives the intermediate position of the collar represented at 11 in FIG. 4.

The very simple closing of the collar is accomplished by engaging the opening 12 of the tip 4 over the head 12′ of the ramp 5, the saw-teeth 13 coming into engagement over the teeth 14 in the inverse sense of the ramp. It is only necessary to push the tip towards the base and the anchorage is automatic at the end of the operation as shown at 7, 9 and 11. The operation is normally effected with a finger, but if the tube should be subjected more strongly in such a manner as to gain a notch, the flexibility of the plastic material helping, it is sufficient to exert a pressure on the ledge 15 of the base 4 with the aid of a screw driver or similar instrument as indicated at 15′ in FIG. 2.

In order to unfasten the collar it is sufficient to introduce the point of a small screw driver 16′ between the strap and the tenon at 16 and by a reciprocal levering movement laterally of the tube to disengage successively the saw-teeth of the cheeks 17 of the mortise 4. The slot 18 may be provided in the strap in order to facilitate this introduction, the slot augmenting the latitude of disengagement in this area.

For its function, the mortise disposed on the tip 4 comprises two internal faces, symmetrically disposed and provided with saw-teeth 13 and two smooth internal faces disposed in an asymmetric manner, one of the faces being constituted by the extremity of the strap 3. The faces provided with teeth comprise extensions 20 forming an angle of 45° or thereabouts and having the purpose of ensuring the solidity of the assembly after securement to the inverse form of the ramp 5. This embodiment is such that the notched ramp is entirely utilized (position 7, FIG. 2), which increases the number of tubes of different diameter which may be fixed by the same strap. This is made possible by the asymmetric arrangement of the tip 4, the extremity of the strap 21 which is situated approximately in the same plane as the ledge 15 comes to abut, in the minimum position, against the bottom of the slot 19 of the base 1.

The collar shown in FIGS. 5 and 6 comprises a base 1 analogous to that of the embodiment above, but to which is attached at 22 a double strap 3 comprising limbs 32 and 33 which embrace the tube. This double strap is connected by two walls 31 which may be curved or concave to the tip 4 which presents the mortise. To permit the disengagement of the strap the gap 18 which separates the two limbs 32 and 33 is wider than the notched ramp 5 including the saw-teeth 14.

FIG. 5 shows the insertion of a tube of maximum size for this type of collar and which is fixed. The tip 4 is accordingly in the position 34 at the maximum height of the ramp 5. The axis (ef) of the tube is precisely displaced with reference to the axis (gh) of the attachment aperture 2. The tube is in contact at 30 with the ramp 5, the latter acting to abut the tube. The extension or shoulder 29 is for reinforcing the rigidity of the collar in linking the base 1 to the ramp 5; its concave face matches the form of the smallest of the tubes to be fixed. A chimney 28 pierced in the ramp 5 is provided in order to reduce the weight of the piece while ensuring the rigidity of the ramp. It may be provided equally as an eventual placement for a complementary point or screw 4 for attachment.

In order to avoid an undesired disengagement of the teeth, under the extreme or accidental stress, the mortise 4 only has three faces, the cheeks 17 being provided with saw-teeth 13 inclined in the same manner as the saw-teeth 14 of the notched ramp 5 that is to say at an angle α. This angle permits the positioning of the collar uniquely under a predetermined action between the ramp and the mortise for example with the aid of the point of a screw driver.

FIG. 6 represents the collar without the tube in an intermediate position 35. It shows well that all the component parts of the collar are designed to eliminate useless material and to conserve only those elements which are strictly necessary, so as to reduce to the minimum the weight which is a determining criterion of the profit. In this modification, the mortise only has three faces without abutment. It can in this case slide on the ramp without being limited in the length of its course except by the length of the ramp, the length of the strap and the diameter of the tube. Consequently it is uniquely the thickness of the base which determines the capactiy of the number of tubes of different diameter which it is possible to fix on each collar.

FIG. 7 shows another modification of double strap which may ro may not comprise a base, the central part not being shown in the drawing. The conception is identical but the thickness of the notched ramp may be smaller, the angle of inclination of the teeth 13 and 14 being maintained.

The notched ramp being disposed in the extension of the double strap 32 and 33, the mounting (FIG. 8) of this bridle over two tubes 46 and 47 allows the same utilization as for the first modification, the gap 18 being of sufficient width to permit the sliding of the saw-teeth 13. The component parts of the mortise 4 are identical, in all cases the sides of the cheeks 17 and of the coacting link 31 may be different so that the course of engagement is not limited by the abutment presented by the jutting out of the base.

The two tubes 46 and 47 assembled side by side have points of contact 50 and 51 with the collar which are tangential. In the same manner, it is not impossible to assemble two or more tubes separated by a free space and there may be arranged, on the same principle, a collar of which the development length is adapted to this function, the dimensions of the component parts of the collar being proportional in consequence. The mounting and demounting is effected in the same fashion as that which has been described for the first modification of FIGS. 5 and 6.

The third modification concerns a fastener which may constitute a collar of which the base is not shown in the drawing or a simple continuous strap which encircles the tube. This conception applies more particularly to tubes or objects of larger dimensions than those of the preceding examples, as indicated in FIGS. 9 to 12.

In the first place, the thickness of the ramp 5 has been reduced so that it approximates to the thickness of the strap 36 and presents only a supple continuous band of which the end 48 engages in operation within the slot 41 of the mortise member 4.

So that the system of notching or snap-engagement takes place under satisfactory conditions, it is necessary that it takes place in a straight line manner and next, in the tangential sense of the tube as shown in FIG. 10. After avoiding too large a deformation of the tip 4 under the effort of closure and of torsion while in place, it is given approximately the form of a dihedral, the angle of which is greater than 90°. This tip is constituted by the extremity 37 of the strap and the cheeks 17, which are linked together by reinforcement cheeks 38 which constitute the part of maximum width.

The cheeks 17 are narrower and longer and to compensate for the solidity of fixture, the teeth 13 are more numerous.

The mounting of a collar on a tube can only be carried out if assured by three points of applied pressure. The anchorage of the saw-teeth is the first, the abutment of the strap on the extremity 39 of the tip is the second. This extremity constitutes also the fourth face of the mortise member and serves as a guide and support for the strap. The third pressure point is provided by the pressure of the tube on the strap at 40 at the point of maximum connection of the cheeks 38 with the cheeks 17 and the saw-teeth 13.

The disengagement of the collar is simple. It suffices, for example and if necessary, to introduce the point of a screwdriver at the chamfered extremity 42 and then to exert a levering movement to urge the mortise to a position 44 (FIG. 9) of automatic disengagement of the strap. The mortise is of sufficient rigidity to pivot about an imaginary axis 45 represented by the most supple part of the extremity 49 of the strap. Unnotching takes place under this action and the slot 41, of width at least double the thickness of the strap, reaches the portion of the slot beyond the abutment 39. The strap is no longer pressed and so slides without retention.

What I claim is:

1. A fastener for tubes and like objects comprising a strap having adjacent one end anchoring means and adjacent the other end receiving means for the anchoring means, the said anchoring means and receiving means each having two opposed faces formed with cooperating saw-teeth or barbs which are arranged to interengage and lock in a variable end position when the strap is laid around one or more said objects and the said anchoring means pressed into the receiving means, the crest of the said teeth of the receiving means being parallel to each other subtending with the longitudinal axis of said strap an angle other than a right angle, the teeth of anchoring means being inclined at the same angle so as to ensure an automatic anchoring when the fastener is closed.

2. A fastener for tubes and like objects comprising a strap having adjacent one end anchoring means and adjacent the other end receiving means for the anchoring means, the said anchoring means and receiving means each having two opposed faces formed with cooperating saw-teeth or barbs which are arranged to interengage and lock in a variable end position when the strap is laid around one or more said objects and the anchoring means pressed into the receiving means, the said receiving means comprising a tip or ferrule longitudinally shaped with dihedral faces subtending more than 90° and having in the vicinity of its peak an opening through which the anchoring means is adapted to pass, the teeth of said said receiving means being formed in side walls of the opening which are perpendicular to the said dihedral faces.

3. A fastener as claimed in claim 2, wherein the edge of the opening farthest removed from the walls carrying the teeth is situated in a plane passing through the free extremities of the teeth.

4. A fastener as claimed in claim 2, wherein the anchoring means is formed by a portion of the strap.

References Cited

UNITED STATES PATENTS

| 973,532 | 10/1910 | McLaughlin | 24—20 |
|---|---|---|---|
| 2,884,214 | 4/1959 | Wrobel. | |
| 3,054,585 | 9/1962 | Roberts et al. | 248—74 |
| 3,086,265 | 4/1963 | Orenick et al. | 24—30.5 |
| 3,118,200 | 1/1964 | Bell | 24—16 |
| 3,197,164 | 7/1965 | Hansen. | |

FOREIGN PATENTS 1,052,285  12/1966  Great Britain.

DONALD A. GRIFFIN, Primary Examiner

U.S. Cl. X.R.

248—74